Patented May 3, 1927.

1,627,144

UNITED STATES PATENT OFFICE.

GEORG BREDIG AND EGON ELÖD, OF KARLSRUHE, GERMANY, ASSIGNORS TO THE FIRM OF RUDOLPH KOEPP & CO., OF OESTRICH-ON-THE-RHINE, GERMANY, A SOCIETY ORGANIZED UNDER LAWS OF GERMANY.

PROCESS FOR THE PRODUCTION OF HYDROCYANIC ACID.

No Drawing. Original application filed January 28, 1924, Serial No. 689,156. Divided and this application filed November 21, 1924, Serial No. 751,375, and in Germany December 7, 1922.

This application is a division of our application 689,156, filed January 28, 1924.

It is already known how to produce hydrocyanic acid by passing ammonia and carbon monoxide over catalytically acting substances at higher temperatures.

The present invention relates to certain improvements for the production of hydrocyanic acid by the process mentioned.

The invention refers more especially to the proportions of the gases introduced into the process in combination with the use of suitable catalysts. Moreover, according to the invention, protecting gases as hydrogen or gases containing the same may be used advantageously.

The main feature of the invention consists in using considerable excess of carbon monoxide or substances containing the same, e. g. generator gas, gas from coking or the like, in proportion to the ammonia. By working in this way it will be possible to accelerate the desired formation of hydrocyanic acid considerably and to avoid, as far as possible the undesirable decomposition of the ammonia, especially in avoiding too high temperatures. According to the effect of the catalysts used and to the kind of the gaseous initial substances, the excess of carbon monoxide, or of the mixtures of these two respectively will amount to approximately two to ten times the volume of the ammonia.

The following substances can be used as catalysts in the process in question, e. g. compounds of silicon, titanium, thorium, zirconium, molybdenum, uranium and vanadium, as well as compounds of the group-relations of the above-mentioned substances. Furthermore oxides of the elements of rare earths or mixtures of such oxides with other catalytically effecting substances, for instance with aluminum oxide, may serve as suitable catalysts.

The mentioned catalysts may be used alone or mixed with one another, or mixed with other catalysts. An extraordinary increase of the speed of reaction has been produced, for instance, by the use of a mixture of cerium oxide with aluminium oxide, especially in the proportion of 2:1. The catalysts may be used as they are or on carriers, as for instance clay slabs and the like.

The above-mentioned catalysts may further be totally or partly replaced by other substances, especially by carbides, for instance of silicon or titanium, zirconium or the like, for instance silite or siloxicon (silit or siloxicon). These kinds of carbides act catalytically on the one hand, and as good conductors of heat on the other. They may be used as catalysts or together with other catalysts and especially as carriers for other catalysts. It will be possible, for instance, to bring into these carbides, aluminium oxide, the oxides of thorium, cerium, zirconium, vanadium or the like, or mixtures of such catalysts. The use of carbides presents the further advantage that electric internal heating may be used for instance in such a manner that the contact-mass is inserted as formed heating body or loosely, for instance, in the shape of grains, in an electric circuit. This manner of heating presents the advantage that the contact-mass can be brought to the desired temperature and maintained simply by regulating the intensity of the current.

It has further been found that by a considerable addition of hydrogen as protecting gas, that is to say more than 1 volume for example 2–10 volumes to 1 volume of ammonia, the undesirable decomposition of ammonia may be avoided as far as possible. Beside hydrogen, gases which contain the same, as for instance water-gas or gasses and vapours from molasses-waste and the like, may be used as protecting gas. It is especially advisable to work with excess of carbon monoxide and to take care that considerable quantities of this protecting gas, for instance of hydrogen, are present. When working with water-gas, or gas mixtures which contain comparatively more hydrogen than these substances, it is advisable to use for one volume element of ammonia-gas for instance 5–10 volume elements of water-gas which is approximately the equivalent to 2.5 to 5 volumes of hydrogen to 1 of ammonia.

In the presence of protecting gases e. g. hydrogen, the decomposition of the ammonia, itself under ordinary pressure, is reduced considerably more than when working only with excess of carbonic oxide gas.

The height of temperature depends on the quality of the catalysts, on the kind of reaction-gas, and diluting means, the concentration of the gaseous nitrogen compounds and on the velocity of flow of the gases. It is generally advisable to select temperatures between 400 and 800° C. Temperatures between 500 and 600° C. are especially advantageous.

When working according to the invention it is possible to convert the nitrogen compounds used almost quantitatively into hydrocyanic acid. A further advantage consists in the possibility of working also moist gases, so that the process of preliminary drying the same has been superseded. It is further not necessary that the gas be specially pure.

When observing the above-described working method, viz, the application of the carbon monoxide in considerable excess or in presence of considerable quantities of protecting gases like hydrogen or nitrogen, or these two measures together in combination with the avoiding of too high temperatures, it is also possible, as has been found out, to obtain satisfactory outputs in hydrocyanic acid with the aid of other catalysts but those mentioned above, the metals or metal compounds of the iron-or platinum-group being excluded. The catalysts for instance aluminium oxide, thorium oxide, zirconium oxide or the like, may be used either alone or in mixture with other catalysts, if desired on carriers, especially in combination with carbides, in which the latter may serve as carriers.

The objections to the employment of iron being known, it is advisable to avoid iron and iron compounds especially also an iron apparatus. The apparatus may preferably consist, for instance, of copper or of ceramic material.

*Examples.*

(1) 3.75 cubic meters of carbon monoxide and 0.75 cubic meters of ammonia gas are conducted at 600° C. over a contact body consisting of thorium oxide which has been precipitated on clay slabs. The output per hour is about 145 grams of hydrocyanic acid and approximately 0.487 cubic meters of unaltered ammonia.

(2) 150 cubic meters of water gas and 15 cubic meters of ammonia gas are conducted at 600° C. over a contact body consisting of cerium oxide spread on silicon carbide. About 4.5 kg. of hydrocyanic acid and approximately 10 cubic meters of unaltered ammonia are obtained per hour.

Claims:

1. A process for the production of hydrocyanic acid, consisting in causing carbon monoxide and ammonia to react at high temperatures in the presence of oxides of metals of the 3rd, 4th, 5th and 6th groups, in the presence of more than 1 volume of hydrogen to 1 volume of ammonia.

2. A process for the production of hydrocyanic acid, consisting in causing carbon monoxide and ammonia to react at high temperatures in the presence of oxides of metals of the 3rd, 4th, 5th and 6th groups, in the presence of more than 2 volumes of hydrogen to 1 volume of ammonia.

3. A process for the production of hydrocyanic acid, consisting in causing carbon monoxide and ammonia to react at high temperatures in the presence of oxides of metals of the 3rd, 4th, 5th and 6th groups, in the presence of 2.5 to 5 volumes of hydrogen to 1 volume of ammonia.

4. A process for the production of hydrocyanic acid, consisting in causing ammonia and an excess of carbon monoxide to react at high temperatures in the presence of oxides of metals of the 3rd, 4th, 5th and 6th groups, in the presence of such quantities of hydrogen that the ammonia is protected by the hydrogen against decomposition.

5. A process for the production of hydrocyanic acid consisting in causing ammonia and an excess of carbon monoxide amounting to several times the ammonia, to react at high temperatures in the presence of oxides of metals of the 3rd, 4th, 5th and 6th groups, in the presence of such quantities of hydrogen that the ammonia is protected by the hydrogen against decomposition.

6. A process for the production of hydrocyanic acid consisting in causing ammonia and an excess of carbon monoxide amounting to several times the ammonia, to react at high temperatures in the presence of metals of the 3rd, 4th, 5th and 6th groups, in the presence of more than 1 volume of hydrogen to 1 volume of ammonia.

In testimony whereof we affix our signatures.

GEORG BREDIG.
EGON ELÖD.